United States Patent
Janssen

(10) Patent No.: US 7,320,654 B2
(45) Date of Patent: Jan. 22, 2008

(54) RATIO CONTROL SYSTEM FOR AN AUTOMATIC TRANSMISSION IN A VEHICLE

(75) Inventor: Peter Janssen, Maasbracht (NL)

(73) Assignee: ZF Friedrichshafen AG, 88038 Friedrichshafen (DE)

( * ) Notice: Subject to any disclaimer, the term of this patent is extended or adjusted under 35 U.S.C. 154(b) by 543 days.

(21) Appl. No.: 10/930,016

(22) Filed: Aug. 30, 2004

(65) Prior Publication Data

US 2005/0059528 A1   Mar. 17, 2005

(30) Foreign Application Priority Data

Sep. 11, 2003   (DE) .............................. 103 41 917

(51) Int. Cl.
*F16H 59/00*   (2006.01)
(52) U.S. Cl. .......................................... 474/28; 474/18
(58) Field of Classification Search .................. 474/18, 474/28; 477/44–50; 701/51
See application file for complete search history.

(56) References Cited

U.S. PATENT DOCUMENTS

| | | | |
|---|---|---|---|
| 4,790,214 A * | 12/1988 | Hattori et al. ................ 701/51 |
| 4,798,561 A * | 1/1989 | Hattori et al. ................ 474/28 |
| 5,088,352 A * | 2/1992 | Ishimaru ..................... 477/46 |
| 6,099,424 A * | 8/2000 | Tsai et al. ................... 474/18 |
| 6,117,045 A * | 9/2000 | Hopper ....................... 477/44 |
| 6,224,509 B1 * | 5/2001 | Gierling ...................... 477/45 |
| 6,299,564 B1 | 10/2001 | Gessler et al. |
| 6,537,176 B2 * | 3/2003 | Fessler ....................... 477/45 |
| 6,572,507 B1 | 6/2003 | Korkmaz et al. |
| 6,723,018 B2 | 4/2004 | Hayabuchi et al. |
| 7,029,409 B2 * | 4/2006 | Sommer et al. ............... 474/28 |

(Continued)

FOREIGN PATENT DOCUMENTS

DE   195 33 976 A1   3/1997

(Continued)

*Primary Examiner*—Marcus Charles
(74) *Attorney, Agent, or Firm*—Davis Bujold & Daniels, PLLC

(57) ABSTRACT

A procedure for the control of ratio-change occurrences of an automatic transmission in a motor vehicle, which vehicle possesses a hydraulic system with at least two hydraulic pressure branches (3, 9) with different hydraulic pressures, wherein in a first hydraulic pressure branch (3) controllable pressure reducing valves (4, 5) can be found, by which the hydraulic users (S1, S2) can be supplied with an activation pressure, wherein in the first hydraulic pressure branch (3), a pressure regulation valve (6) is placed, the exit port of which is connected to a line of the second hydraulic pressure branch (9), and wherein by the activation of the pressure regulation valve (6) the pressure in the first hydraulic circuit (3) is adjustable, and whereby in the first hydraulic pressure branch (3) a hydraulic pressure is provided, which represents the highest, necessary operational pressure of the hydraulic users (S1, S2, 11) plus an offset pressure. Further, provision is made that in certain operational conditions of the motor vehicle, one of the pressure reducing valves (4, 5) of, respectively, one of the two ratio-changing organs (S1, S2) remains fully open and the offset-pressure becomes reduced to the value of zero, or to nearly zero, and upon the removal of said certain operational condition the off-set pressure is once again increased and the pressure reducing valve (5) resumes its function of pressure reduction.

9 Claims, 1 Drawing Sheet

U.S. PATENT DOCUMENTS

2003/0083174 A1  5/2003  Tabata et al.

FOREIGN PATENT DOCUMENTS

| | | |
|---|---|---|
| DE | 199 12 480 A1 | 9/2000 |
| DE | 199 14 931 A1 | 10/2000 |
| DE | 102 00 379 A1 | 8/2002 |
| DE | 102 50 375 A1 | 6/2003 |
| DE | 101 62 877 | 7/2003 |
| JP | 2001-82555 | 3/2001 |

* cited by examiner

RATIO CONTROL SYSTEM FOR AN AUTOMATIC TRANSMISSION IN A VEHICLE

This application claims priority from German Application Serial No. 103 41 917.9 filed Sep. 11, 2003

FIELD OF THE INVENTION

The invention concerns a procedure for the control of ratio-change occurrences in an automatic transmission of a motor vehicle.

BACKGROUND OF THE INVENTION

DE 195 33 976 A1 makes known a hydraulic system for a V-belt, stepless transmission, wherein two hydraulic pressure branches, having two different hydraulic pressures are realized. Connection lines from the first hydraulic pressure branch lead to pressure users, the users being, for instance, corresponding solenoid pressure regulation valves, which are controlled by an electronic control center upon need. In this document, the users will include the primary disk S1, the secondary disk S2, a hydrodynamic torque converter and the lubrication positions for the stepless transmission as well as the vehicle clutch and/or the vehicle operational brake.

The pressure in the first hydraulic branch is adjusted by a controllable pressure regulation valve, which, in the course of maintaining the desired pressure, bypasses to the transmission lubrication storage facility that quantity of pump capacity which is not needed. The pressure regulation function of the said valve, in this operation, is carried out by a separate, solenoid pressure controller. At the same time, this solenoid pressure controller is so regulated, that the pressure in the first hydraulic pressure branch and thus in the line leading to the primary disk as well as to the clutch and/or to the vehicle brake, represents at least, the maximum, necessarily required pressure for their operation.

In the first hydraulic pressure branch, the line forks to a pressure line with a pressure reducing valve, the outlet port of which connects to a pressure line leading to a second hydraulic branch. This pressure reducing valve determines the pressure level of the second hydraulic pressure branch and maintains the pressure constant at that level.

From the constant pressure level which is held in the second hydraulic pressure branch, the solenoid pressure regulator creates a pilot pressure for the adjustment of pressure in the thereto connected lines to various users. This enables, for example, that even the pressure in the hydraulic lines leading to the primary disk is adjustable.

Although it is true, that this hydraulic control system possesses its own advantages, the disadvantage is, that the pressure in the first hydraulic pressure branch is selected, in practice, to be significantly greater than that of the highest necessary pressure level for the remaining hydraulic users. This pressure difference (hereinafter called "offset") runs some three to five bar, and must be additionally generated by the hydraulic pump. This leads to a lessened degree of efficiency of the transmission, which finally penalizes the transmission to a class of higher fuel consumption.

Therefore, with this background, the purpose of the invention, is to make available a procedure for the control of a known hydraulic control apparatus for an automatic transmission, wherein, with the same range of functions as is the case with the known hydraulic control system, and wherein an improved efficiency is acquired.

SUMMARY OF THE INVENTION

The basic concept of the invention is that, the stated purpose can be achieved, if the offset-pressure in the first hydraulic branch is reduced, at least temporarily, to a zero value.

In accord with this, the invention comprises a method for the control of ratio-change procedures in an automatic transmission in a motor vehicle. The said method exhibits the use of at least two hydraulic pressure branches, each having a different hydraulic pressure than the other. In this arrangement, in the first hydraulic pressure branch is to be found a pressure reducing valve, by means of which the hydraulic pressure consumers can be supplied with activating pressure. Added thereto, in the first hydraulic pressure branch is a pressure regulating valve, the output port of which is connected with a line to the second hydraulic pressure branch. In this procedure, the pressure in the first hydraulic pressure branch is adjusted by the action of the aforesaid pressure regulating valve, whereby this hydraulic pressure represents the highest necessary operational pressure of the hydraulic users, plus the said offset-pressure.

Varying from the state of the technology, provision is made in the invented procedure, that under certain operational conditions of the vehicle, one of the pressure reducing valves for one of the positioning members of the two ratio-changing organs, namely S1, S2 is fully open, while simultaneously the offset-pressure is reduced to zero or nearly zero. Further, by the removal of this operational condition, the offset-pressure once again increases and the pressure reducing valve renews its pressure reducing activity.

In the motor vehicle, operational conditions of this sort of can be of such a type, that there can be no further action on the part of a user dependent upon the first hydraulic branch for supply of hydraulic pressure. In particular, this concerns traveling operational situations, in which neither an activation of the clutch or the operational braking, is carried out nor is expected to be carried out.

In a preferred embodiment of the invention, provision is made, that the regulation of the offset-pressure be carried out by the activation of a particular pressure regulating valve which binds together both existing hydraulic pressure branches.

For the execution of the procedure, it is advantageous, if the pressure reducing and the pressure regulating valves are under the guidance of one control and regulation apparatus. This said control and regulation apparatus has access to stored recognition, control, and regulation programs and is connected with pressure sensors in both hydraulic pressure branches and also has sensor equipment for the recognition of the said traveling operational situations. Then, based on the determined sensor data, control and regulation commands are produced and transmitted to the diverting solenoid pressure reducing valves.

In an advantageous embodiment of the invention, provision is made, that with the invented procedure, ratio-change methods of a V-belt, stepless transmission can be controlled and regulated. For this to take place, provision must be made, that with a first pressure reducing valve, the activating pressure for a positioning element for the initiation of a primary disk must be initiated, as well as that for a second pressure reducing valve for a positioning device for the activation of a secondary disk of the V-belt stepless transmission. The second pressure reducing valve, in this arrangement, is advantageously designed as a controllable pressure regulating valve.

Provision is made for a development of the invented procedure, wherein the pressure reducing valve assigned to the secondary disk of the stepless transmission for the adjustment of the ratio of the transmission during the above said operational condition of the motor vehicle, remains fully open.

The regulation of the operational pressure in the power unit of a pressure user is done by means of activating the respective pressure regulation valve, which binds together the two hydraulic pressure branches.

Finally, it would be seen as advantageous, if the thereby regulated offset-pressure lies three to five bar above the highest necessary operating pressure for the power units of the two ratio-change organs of the stepless V-belt transmission or for a different hydraulic user.

BRIEF DESCRIPTION OF THE DRAWING

The invention and its advantageous developments can be further described and explained in greater detail with the aid of the attached drawing (1/1).

FIG. 1 shows a section from a hydraulic control system for a stepless, belt operated transmission in a motor vehicle. This functional construction can well be compared to the hydraulic control system as per DE 195 33 976 A1, with which it is quite similar.

DETAILED DESCRIPTION OF THE INVENTION

Figure 1:
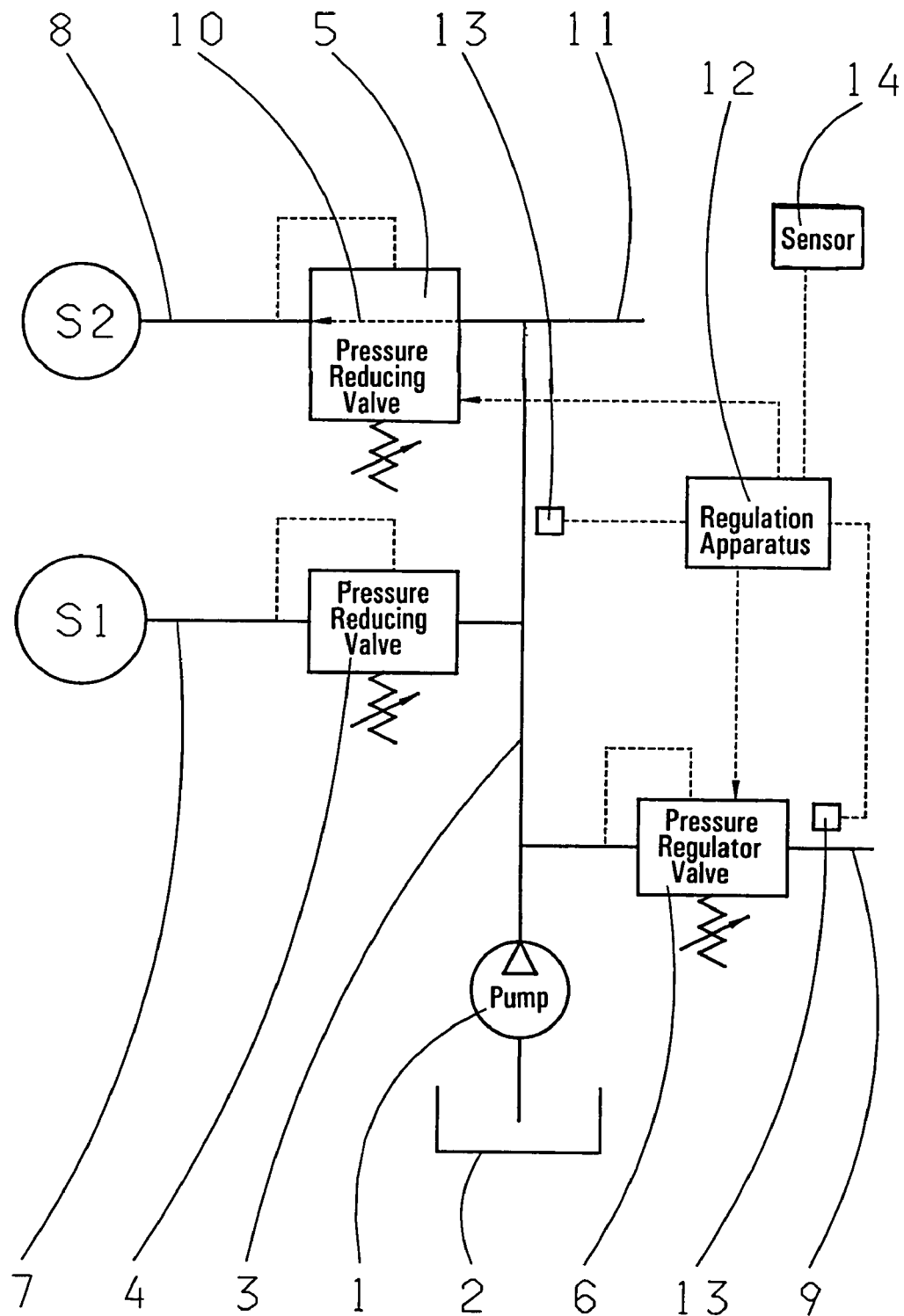

In accord with the said drawing, belonging to the hydraulic control system is a high pressure pump 1, which conveys a hydraulic fluid 2 in a line leading to a first hydraulic pressure branch 3, thereby forming a source for a high pressure hydraulic medium. The pressure obtaining in this first hydraulic pressure branch 3 is exactly adjusted by means of a pressure regulating valve 6, the entry port of which is connected to the first hydraulic branch 3. The output port communicates with piping to a second hydraulic pressure branch 9. With this arrangement, provision is made, that in this second hydraulic pressure branch, the existing hydraulic medium is under a lesser pressure than that in the first hydraulic pressure branch.

In addition, the pressure regulating valve 6, by means of a control line, is in connection with a regulation and control apparatus 12, which, by means of sensor 13, registers the pressures in the two hydraulic pressure branches 3, 9 and can adjust the pressure regulating valve 6 with process-appropriate regulation commands.

From the first hydraulic pressure branch 3, a pressure line 11 departs which supplies certain hydraulic pressure users in the transmission and/or in the motor vehicle with hydraulic fluid under that pressure which governs in the first hydraulic pressure branch 3.

Moreover, to the hydraulic pressure system belong two pressure lines, 7, 8, which lead from the first hydraulic pressure branch 3 to the position activators for the two axially moveable tapered sheave halves, namely disks S1 and S2 which serve the stepless transmission.

In the pressure line 7 leading to the primary disk S1 is found a pressure reducing valve 4, by means of which, the respective radial force on the disks on the belt-contact arc of the transmission is adjustable. This adjustment is necessary for the transmission of a known, required torque.

In addition to this, in the pressure line 8 which leads to the secondary disk S2 of the stepless transmission, is located a pressure reducing valve 5, which exercises two switching functions. In a first switching function this valve operates as a pressure reducer and in a second switching function 10, this valve is fully open, so that the pressure of the hydraulic fluid at its entry port is exactly the same value as that pressure at its exit port.

For an alternate activation of these two switching functions, the pressure reducing valve 5, by means of a control line, would be placed in connection with the said control and regulation apparatus 12.

This control and regulation apparatus 12 determines, as previously noted, by means of corresponding sensor 13 the pressure in the two hydraulic pressure branches 3, 9 as well as, by the sensor 14, the actual state of the condition of the motor vehicle. By means of the control of the pressure regulation valve 6, the desired hydraulic pressure in the first hydraulic pressure branch 3 is adjusted, which is, about an offset-pressure higher than the highest operating pressure in the positioning unit which functions for the secondary disk S2 (for example, piston-cylinder arrangement).

This comparatively higher pressure assures the supply of positioning means for the secondary disk S2 as well as for other hydraulic pressure users in the transmission and/or the motor vehicle.

Insofar as an operational situation may be present, in which, besides the gear shift ratio-change apparatus of the transmission, no other hydraulic pressure user is active, or such activation is not to be expected in the near future, then a command for the pressure regulation valve 6 is produced and sent from the control and regulation apparatus 12, by means of which command, the added offset-pressure increment in the hydraulic pressure medium is reduced to the value of zero or nearly thereto.

Subsequently, the up-to-this-point pressure reducing operating valve 5, by a corresponding command from the control and regulation apparatus 12 is directed to activate the said throughput 10 stance, whereby the principal pressure now governing in the first hydraulic branch 3 will also be found in the pressure line 8.

Since this principal pressure, now reduced by the offset-pressure corresponds to the highest necessary operating pressure of all connected pressure using devices on the first hydraulic pressure branch, subsequently, by a regulated opening of the pressure regulator valve 6, the pressure in the first hydraulic branch 3 is so set, that therewith the desired transmission ratio-change of the stepless belt/chain transmission on the secondary disk S2 can be adjusted.

Insofar as another connected pressure consumer on the first hydraulic pressure branch 3 is to be activated, then, by means of a corresponding control demand, the pressure reducing valve 5 is retracted back into its pressure reducing switching function and subsequently the required offset-pressure in the first hydraulic branch 3, is reinstated by means of a regulated activation of the pressure regulating valve 6.

The present procedure has the advantage, that by means of the reduction of the offset-pressure, the pump load can be reduced on the hydraulic pump 1, which in turn allows for a reduction in the fuel. Using an example of a typical, off the mass production line, stepless transmission, it could be calculated, that by means of such a control procedure, the motor vehicle can be driven with some 35% of the time being devoted to a using cycle in accord with the MVEG-Standard, having therewith a reduced pump load and without the off-set pressure increase.

The invented procedure is advantageously useable with all types of automatic transmissions.

REFERENCE NUMERALS 1 pump
2 sump for unused fluid
3 first hydraulic pressure branch
4 pressure reducing valve
5 pressure reducing valve
6 hydraulic pressure line to primary disk
7 hydraulic pressure line to secondary disk
8 pressure fluid line to secondary disk
9 second hydraulic pressure branch
10 through-flow positioning of valve 5
11 pressure line to other users
12 control, regulation equipment
13 pressure sensor
14 sensor for state of motor vehicle
S1 primary disk
S2 secondary disk

The invention claimed is:

1. A method for the controlling ratio-change occurrences of an automatic transmission in a motor vehicle, by at least first and second hydraulic pressure branches (3, 9) having different pressures wherein,
    placing first and second pressure reducing valves (4, 5) in the first hydraulic pressure branch (3) by which hydraulic users (S1, S2) are supplied with hydraulic pressure, and
    installing a pressure regulation valve (6) in the first hydraulic pressure branch (3) having an output port of which is connected with a line of the second hydraulic pressure branch (9), and
    by the activation of the pressure regulation valve (6), the pressure in the first hydraulic pressure branch (3) the highest, necessary operational pressure of the hydraulic users (S1, S2, 11) plus an offset pressure;
    during certain operational conditions of the motor vehicle, one of the first and second pressure reducing valves (4, 5) for one of positioning devices of the two hydraulic users (S1, S2) of the transmission is fully open, and as well the offset-pressure is reduced to one of a value zero or nearly zero; and
    upon removal of the certain operational conditions, the offset-pressure is once again increased and the pressure reducing valve (5) renews a function as a pressure reducing element.

2. The method according to claim 1, wherein no other hydraulic user supplied by the first hydraulic pressure branch is active, or expected to be active in the immediate future.

3. The method according to claim 2, further comprising the step of associating one of a clutch activation free travel and a brake activation free travel to the operational conditions of the motor vehicle.

4. The method according to claim 1, further comprising the step of accomplishing adjustment of the offset-pressure as well as adjustment of the operational pressure in the positioning device of the hydraulic user, during an opened state of the pressure reducing valve (5), by activation of the pressure regulating valve (6).

5. The method according to claim 1, further comprising the step of controlling the pressure reducing and the pressure regulation valves (4, 5, 6) by a regulation and control apparatus (12).

6. The method according to claim 1, further comprising the step of adjusting the activation pressure of the hydraulic users (S1, S2) by a first pressure reducing valve (4), for a positioning device for the activation of a primary disk (S1), end adjusting the activation pressure, by a second pressure reducing valve (5), for a positioning device for the activation of a secondary disk (S2) of a V-belt operated stepless transmission.

7. The method according to claim 1, further comprising the step of operating the offset-pressure to lie from three to five bar above the highest, necessary operational pressure for one of the positioning device of the hydraulic users (S1, S2) or another of the hydraulic pressure users served by the first hydraulic pressure branch (3).

8. The method according to claim 1, further comprising the step of fully opening a second pressure reducing valve (5) for adjustment of the activation pressure for the positioning device of a secondary disk (S2) in certain operational conditions of the motor vehicle, and a fully open state of the second pressure reducing valve (5) is a "through-flow function".

9. A method for the controlling ratio-change occurrences of an automatic transmission in a motor vehicle, having at least a first pressure branches (3) with a first pressure and a second hydraulic pressure branch (9) with a second pressure, the method comprising the steps of:
    supplying hydraulic pressure to hydraulic users (S1, S2) with the first hydraulic pressure branch (3) and placing first and second pressure reducing valves (4, 5) within the first hydraulic pressure branch (3);
    installing a pressure regulation valve (6) in the first hydraulic pressure branch (3), an output port of the third pressure regulation valve (6) is connected with the second hydraulic pressure branch (9);
    adjusting pressure In the first hydraulic pressure branch (3) by activating the pressure regulation valve (6) such that the pressure in the first hydraulic pressure branch (3) is equal to a necessary operational pressure of the hydraulic users (S1, S2, 11) plus an additional offset pressure;
    fully opening, in a first operational condition of the motor vehicle, one of first and second pressure reducing valves (4, 5) for one of positioning devices of the two hydraulic users (S1, S2) of the transmission, and reducing the offset-pressure to substantially zero, and
    increasing the offset-pressure and renewing a function of the pressure reducing valve (5) as a pressure reducing element when the first operational condition of the motor vehicle is removed.

* * * * *